(12) United States Patent
Son (10) Patent No.: US 10,594,129 B2
(45) Date of Patent: Mar. 17, 2020

(54) APPARATUS FOR DETECTING FAULT OF POWER RELAY OF INVERTER

(71) Applicant: LSIS CO., LTD., Gyeonggi-do (KR)

(72) Inventor: Ju-Beom Son, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 228 days.

(21) Appl. No.: 15/660,224

(22) Filed: Jul. 26, 2017

(65) Prior Publication Data

US 2018/0254624 A1    Sep. 6, 2018

(30) Foreign Application Priority Data

Mar. 6, 2017 (KR) .................. 10-2017-0028093

(51) Int. Cl.
| | | |
|---|---|---|
| *H02M 5/40* | (2006.01) | |
| *H02H 1/00* | (2006.01) | |
| *H02H 7/10* | (2006.01) | |
| *H02H 9/00* | (2006.01) | |
| *H02H 3/04* | (2006.01) | |
| *H02M 1/32* | (2007.01) | |

(52) U.S. Cl.
CPC ............ *H02H 1/0007* (2013.01); *H02H 7/10* (2013.01); *H02H 9/001* (2013.01); *H02M 5/40* (2013.01); *H02H 3/044* (2013.01); *H02M 1/32* (2013.01)

(58) Field of Classification Search
USPC .................................................... 361/86–87
See application file for complete search history.

(56) References Cited

U.S. PATENT DOCUMENTS

| | | |
|---|---|---|
| 5,340,636 A | 8/1994 | Kamada |
| 2008/0150369 A1 | 6/2008 | Suzuki et al. |
| 2011/0084704 A1 | 4/2011 | Myeon et al. |
| 2013/0314012 A1 | 11/2013 | Cho |

(Continued)

FOREIGN PATENT DOCUMENTS

| | | |
|---|---|---|
| CN | 103424690 A | 12/2013 |
| CN | 104569799 A | 4/2015 |
| CN | 105281643 A | 1/2016 |

(Continued)

OTHER PUBLICATIONS

Japanese Notice of Allowance for related Japanese Application No. 2017-143716; action dated Nov. 6, 2018; (3 pages).

(Continued)

*Primary Examiner* — Danny Nguyen
(74) *Attorney, Agent, or Firm* — K&L Gates LLP (57) ABSTRACT

An apparatus for detecting a fault in a power relay of an inverter is disclosed. The apparatus for detecting a fault in a power relay includes: a voltage sensor configured to measure a voltage of a DC link; a current sensor configured to measure an output current applied to an inverter stage; a storage unit configured to store resistance of an initial charge resistor, a time constant of a capacitor, and a reference voltage measured when voltage drop of the DC link does not occur; and a controller configured to determine, when the voltage drop of the DC link occurs, the presence or absence of a fault in the power relay based on a difference between the reference voltage and a voltage measured after lapse of a period corresponding to the time constant.

11 Claims, 5 Drawing Sheets

(56) References Cited

U.S. PATENT DOCUMENTS

2015/0365019 A1* 12/2015 Yamamoto .............. H02P 1/022
                                                            318/490
2016/0380571 A1* 12/2016 Yoshida ............... H02H 7/1216
                                                            318/504

FOREIGN PATENT DOCUMENTS

| | | | |
|---|---|---|---|
| JP | 2000152643 | A | 5/2000 |
| JP | P3243922 | B2 | 10/2001 |
| JP | 2005184910 | A | 7/2005 |
| JP | 2008178286 | A | 7/2008 |
| JP | P4265381 | B2 | 2/2009 |
| JP | 2012120376 | A | 6/2012 |
| JP | 2013243919 | A | 12/2013 |
| JP | 2016100983 | A | 5/2016 |
| JP | 2017017805 | A | 1/2017 |
| JP | 2017043274 | A | 3/2017 |
| KR | 10-1314114 | B1 | 10/2013 |
| KR | 10-1623230 | B1 | 5/2016 |
| KR | 101689993 | B1 | 12/2016 |

OTHER PUBLICATIONS

Japanese Office Action for related Japanese Application No. 2017-143716; action dated Jun. 12, 2018; (3 pages).
European Search Report for related European Application No. 17182267.9; report dated Mar. 16, 2018; (9 pages).
Chinese Office Action for related Chinese Application No. 201710648478.9; action dated Dec. 16, 2019; (10 pages).

* cited by examiner

APPARATUS FOR DETECTING FAULT OF POWER RELAY OF INVERTER

CROSS-REFERENCE TO RELATED APPLICATIONS

This application claims the priority of Korean Patent Application No. 10-2017-0028093 filed on Mar. 6, 2017, in the Korean Intellectual Property Office, the disclosure of which is hereby incorporated by reference in its entirety.

BACKGROUND

1. Technical Field

The present disclosure relates to an apparatus for detecting a fault in a power relay of an inverter.

2. Description of the Related Art

When an inverter is started, initial charging is carried out. During the initial charging, a power relay connected in parallel to an initial charge resistor is opened. The initial charge resistor serves to prevent an inrush current during the initial charging. Thereafter, the power relay of the inverter is closed using a control signal for normal operation of the inverter.

Figure 1:
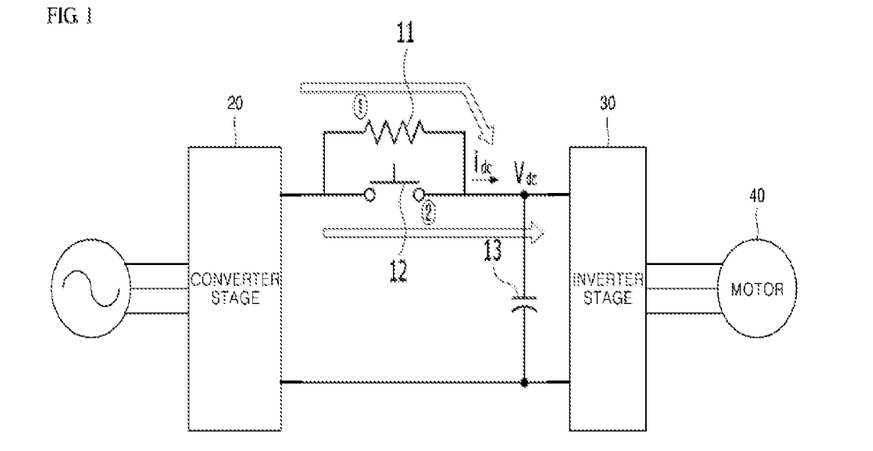
FIG. 1 is a diagram illustrating a current flow during initial charging of an inverter.

FIG. 1 is a diagram illustrating a current flow during the initial charging of the inverter.

Referring to FIG. 1, a converter stage 20 converts alternating current (AC) into direct current (DC) and provides a smoothing circuit with the direct current (DC).

The smoothing unit typically includes a DC link in which a capacitor 13 is disposed, a resistor 11, and a power relay 12.

When the inverter is driven, a current flows as indicated by arrow ① of FIG. 1. This is to prevent an inrush current during introduction of the initial current. When the power relay 12 is closed (ON) by a control signal generated inside the inverter, a current flows as indicated by arrow ②. The current flows as indicated by arrow ② even when a motor 40 is driven, and an output current to an inverter stage 30 increases, such that the current (idc) also increases. If the power relay 12 is damaged during driving of the motor 40, the current may flow again as indicated by arrow ①, such that the current flowing in the initial charge resistor 11 may deviates from rated capacity. As a result, the initial charge resistor 11 may be damaged and may causes heat, such that the internal structure of the inverter may also be damaged.

SUMMARY

It is an object of the present disclosure to provide an apparatus for detecting a fault in a power relay of an inverter, which includes a single voltage sensor and determines whether there is a fault in the power relay by calculating a voltage drop.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an apparatus for detecting a fault in a power relay of an inverter includes: a voltage sensor configured to measure a voltage of a DC link; a current sensor configured to measure an output current to an inverter stage; a storage unit configured to store a resistance of an initial charge resistor, a time constant of a capacitor, and a reference voltage measured when no voltage drop occurs at the DC link; and a controller configured to determine, when the voltage drop occurs at the DC link, whether there is a fault in the power relay based on a difference between the reference voltage and a voltage measured after a period of time corresponding to the time constant has elapsed.

The controller may compare the difference between the voltages with a voltage drop determined by the output current and the resistance, thereby determining whether there is a fault in the power relay.

The controller may compare a rate of the voltage drop for each unit time measured when the voltage drop occurs with a rate calculated based on the measured output current, thereby determining whether the voltage drop lasts.

The controller may determine whether there is a fault in the power relay when the voltage drop lasts for the time-constant period.

According to an exemplary embodiment of the present disclosure, by employing a single voltage sensor and calculating a voltage drop, it is possible to determine whether there is a fault in a power relay.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

The embodiments of the present disclosure will hereinafter be described with reference to the attached drawings.

Figure 2:
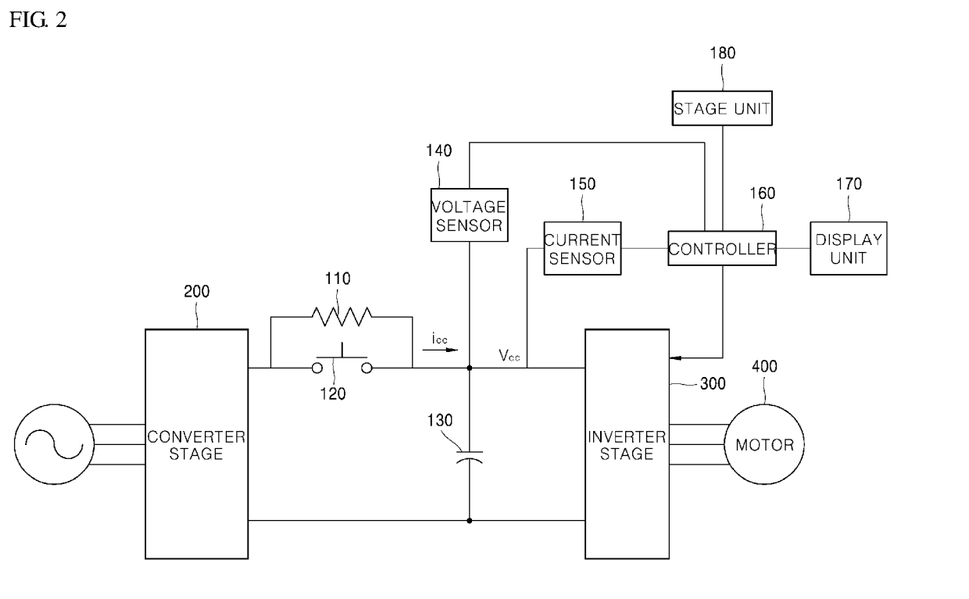
FIG. 2 is a diagram illustrating an apparatus for detecting a fault in a power relay of an inverter according to an exemplary embodiment of the present disclosure.

FIG. 2 is a view illustrating an apparatus for detecting a fault in a power relay of an inverter according to an embodiment of the present disclosure.

Referring to FIG. 2, the apparatus for detecting a fault in a power relay of an inverter may include a voltage sensor 140, a current sensor 150, a controller 160, a display unit 170, and a storage unit 180.

The apparatus for detecting a fault in a power relay of the inverter according to an embodiment of the present disclosure may be an internal element of the inverter or may be an external device or component detachably connected to the inverter. That is, the technical scope of the present disclosure is not limited by an apparatus for detecting a fault in the power relay of the inverter but encompasses an inverter capable of detecting a fault in the power relay.

A converter stage 200 may convert an AC voltage into a DC voltage.

The inverter stage 300 may convert a DC voltage smoothed by a capacitor 130 into a 3-phase AC voltage, and may provide the motor 400 with the 3-phase AC voltage.

The initial charge resistor 110 may be disposed between the converter stage 200 and a DC link having the capacitor 130. The initial charge resistor 110 may also be connected in parallel to the power relay 120.

The initial charge resistor 110 may prevent an inrush current from occurring during initial driving of the inverter.

The power relay 120 may be disposed between the converter stage 200 and the DC link having the capacitor 130 and may be connected in parallel to the initial charge resistor 110.

The power relay 120 remains opened (OFF) prior to driving of the inverter. The power relay 120 is closed (ON) according to a control signal generated inside the inverter after a predetermined time period has elapsed.

The capacitor 130 may be disposed between the converter stage 200 and the inverter stage 300 and may smooth the DC voltage generated from the converter 200.

The voltage sensor 140 may be connected to both ends of the capacitor 130 of the DC link, may measure a DC link voltage applied to the capacitor 130, and may provide the controller 160 with the measured DC link voltage. The DC link voltage may be measured at regular intervals of a unit time. For example, the voltage sensor 140 may periodically measure the DC link voltage at intervals of 1 millisecond (ms).

The current sensor 150 may measure an output current to the inverter stage 300 and may provide the controller 160 with the measured output current.

The controller 160 may store the DC link voltage measured by the voltage sensor 140 in the storage unit 180. A reference voltage, which is a voltage measured when the voltage is stabilized (i.e., when no voltage drop occurs), may be stored in the storage unit 180.

In addition, when voltage drop occurs in the DC link, the controller 160 may compare a rate of voltage drop per unit time measured by the voltage sensor 140 with a rate calculated using the output current measured by the current sensor 150, to determine whether there is a fault based on the results of comparison.

The comparison between the rate of voltage drop per unit time and the calculated rate based on the output current can be represented by Mathematical Expression 1 below:

$$\frac{(V_{n+1} - V_n)/t_p}{i_{out}/i_{std}} > \frac{i_{dc} \times R}{\tau} \qquad [\text{Expression 1}]$$

where n and n+1 are symbols for distinguishing voltage measurement times, $i_{out}$ denotes an output current, $i_{std}$ denotes a rated current, $t_p$ denotes a time interval between the voltage measurement times, $i_{dc}$ denotes a current passing through the initial charge resistor 110, R denotes the initial charge resistor 110, and $\tau$ denotes a time constant of the RC circuit.

In Expression 1, the rate of voltage drop per unit time depends on the output current which is compared with the value acquired by dividing the calculated current ($i_{out}$) by the time constant $\tau$. Voltage drop may occur for various reasons. Among voltage drops caused by various reasons, Expression 1 provides a basis for assuming that voltage drop is caused by damage to the power relay 120. That is, by using Expression 1, the controller 160 determines that there is a high possibility that the amount of voltage drop per unit time equals to the amount of voltage drop across the initial charge resistor 110 resulted from the damaged power relay 120.

The current $i_{dc}$ may be calculated based on $i_{out}$, which will be described later.

The controller 160 may determine that voltage drop lasts if the left-hand side is larger than the right-hand side in Expression 1.

For example, the controller 160 may continuously store the DC link voltage in the storage unit 180 while it determines whether such voltage drop lasts.

If voltage drop lasts for a time period corresponding to a time constant, the controller 160 may determine that there is a fault in the power relay 120.

The controller 160 may determine whether there is a fault in the power relay 120 by comparing the difference between the stored reference voltage with the voltage measured after the time constant has elapsed with the calculated value.

The calculated value is the amount of voltage drop calculated using the output current and the resistance, which are compared as represented by Mathematical Expression 2:

$$\frac{(V_i - V_f)}{i_{out}/i_{std}} > i_{dc} \times R \qquad [\text{Expression 2}]$$

where $V_i$ denotes a reference voltage, and $V_f$ denotes a voltage measured after a time period corresponding to the time-constant has elapsed.

The controller 160 may determine that there is a fault in the power relay 120 if the left-hand side is larger than the right-hand side in Expression 2, and may determine that there is no fault in the power relay 120 otherwise.

The display unit 170 may be connected to the controller 160 to display information under the control of the controller 160 and may indicate whether there is a fault in the power relay 120.

The display unit 170 may include a light-emitting diode (LED) lamp, which may be used to indicate whether there is a fault in the power relay 120. It is to be noted that this is merely illustrative. The display unit 170 may be implemented as a screen, such that a user can check if there is a fault from the screen.

When the display unit 170 is implemented as a screen, the display unit 170 may include a touchscreen. In this case, the user may check if there is a fault by touching the touchscreen.

The display unit 170 may also be replaced with a speaker that can be incorporated in the inverter. If the controller determines that there is a fault in the power relay 120, it operates the speaker to audibly notify the user that there is the fault in the power relay 120.

The storage unit 180 may be connected to the controller 160 and may store the resistance of the initial charge resistor 110, the time constant related to the capacitor 130, the reference voltage, the rated current, and the like.

The storage unit 180 may also store the history of measured voltages measured while the controller 160 determines whether voltage drop lasts.

Figure 3:
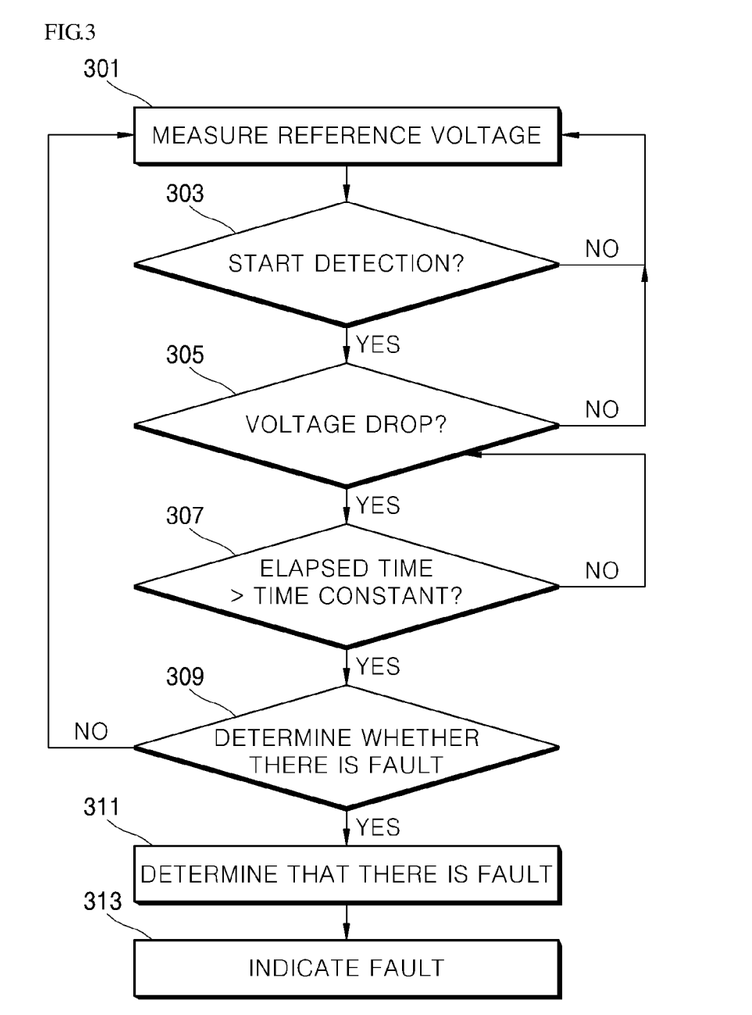
FIG. 3 is a flowchart illustrating a method for detecting a fault in a power relay of an inverter according to an exemplary embodiment of the present disclosure.

FIG. 3 is a flowchart illustrating a method for detecting a fault in the power relay of the inverter according to an exemplary embodiment of the present disclosure.

The method illustrated in FIG. 3 may be carried out by the apparatus for detecting a fault in the power relay of the inverter. In the following description, the method is carried out by the apparatus for detecting a fault in the power relay of the inverter.

In step S301, the voltage sensor 140 may measure a reference voltage.

The controller 160 may store the measured reference voltage in the storage unit 180.

In step S303, the controller 160 may determine whether to start detection.

The determining whether to start detection means determining whether to start determining whether a voltage drop lasts.

It is determined whether to start detection based on Expression 1. If the left-hand side is larger than the right-hand side of Expression 1, it may proceed to step S305, otherwise it may return to step S301.

In step S305, the controller 160 may receive information regarding a voltage measured at regular intervals and may determine whether voltage drop lasts. If voltage drop continuously occurs, it proceeds to step S307. Otherwise, it returns to step S301.

In step S307, the controller 160 may determine whether a time has elapsed more than the time constant after the detection has started. If so, it proceeds to step S309. Otherwise, it returns to step S305.

In step S309, the controller 160 may determine whether there is a fault in the power relay 120. It may be determined whether there is a fault based on Expression 2. If the left side is larger than the right side in Expression 2, it proceeds to step S311. Otherwise, it returns to step S301.

In step S311, the controller 160 may determine whether there is a fault in the power relay 120. The controller 160 may log a fault in the power relay 120 in the storage unit 180.

In step S313, the controller 160 may indicate whether there is a fault in the power relay 120.

Figure 4:
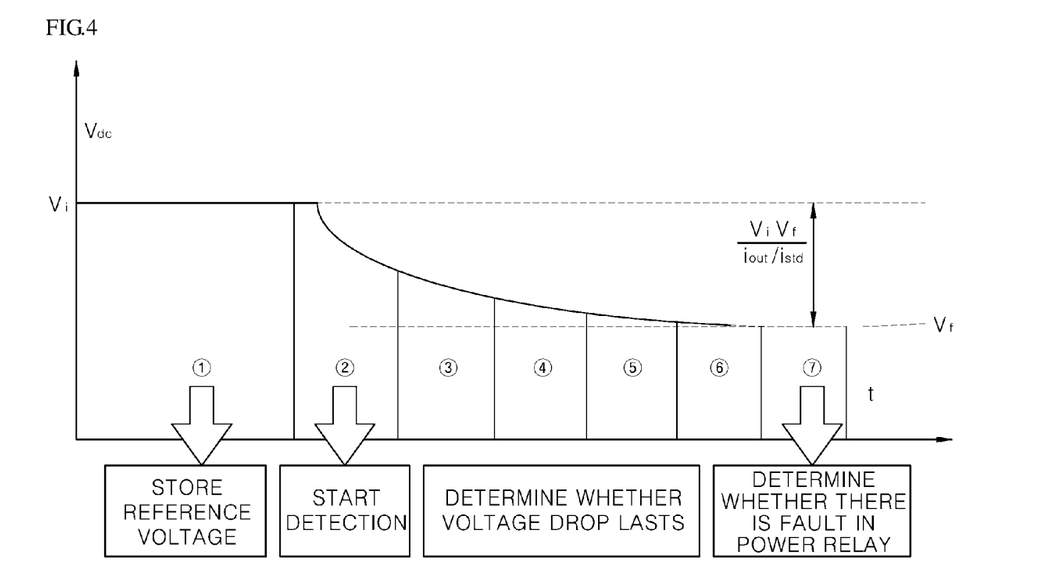
FIG. 4 is a graph illustrating voltage drop over time.

FIG. 4 is a graph illustrating voltage drop over time.

In the graph, $V_{dc}$ denotes the voltage across the DC link, i.e., the voltage measured by the voltage sensor 140.

At time point ①, a reference voltage is measured, and no voltage drop occurs. This point may indicate that the power relay 120 is operating normally.

At time point ②, the controller 160 determines whether to start detection. It may be determined whether to start detection based on Expression 1.

At time points ③ to ⑥, the controller 160 determines whether voltage drop lasts.

At time point ⑦, the time constant has elapsed, and the controller 160 determines whether there is a fault in the power relay 120.

Figure 5:
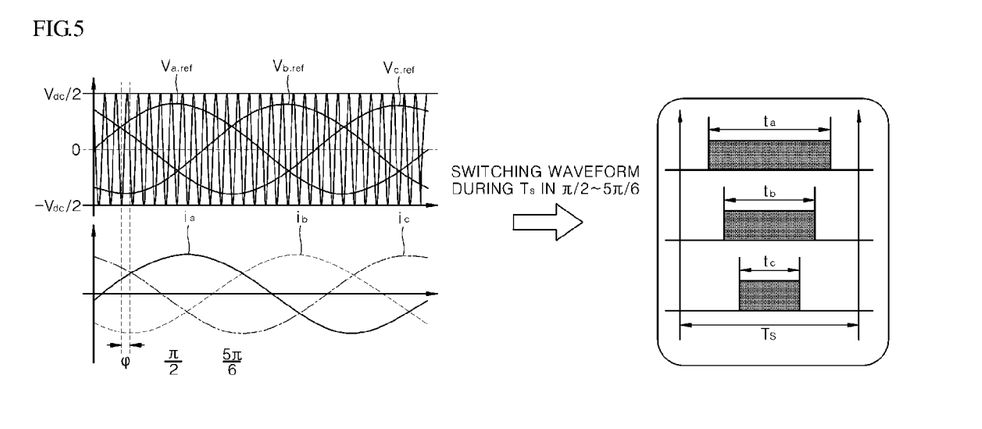
FIG. 5 illustrates characteristics of an output current to the inverter.

FIG. 5 illustrates characteristics of the output current to the inverter 300.

The view at the left upper side of FIG. 5 shows components of the 3-phase (i.e., a-phase, b-phase and c-phase) output voltage over time. The view at the left lower side of FIG. 5 shows components of the 3-phase output current over time. The view at the right side of FIG. 5 shows switching waveforms for a time period $T_s$ in the interval from $\pi/2$ to $5\pi/6$.

The average of the output current for the time period $T_s$ becomes the $i_{dc}$ component of the output current.

The output current during a time period $(T_s - t_a + t_c)$ becomes zero, and the output current during a time period $(t_a - t_b)$ may be $i_a$. The output current during a time period $(t_b - t_c)$ may be $i_a + i_b$.

The interval from $\pi/2$ to $5\pi/6$ may be repeated six times. By expanding the expression with respect to the $i_{dc}$ using the interval as a representative interval, the Expressions 3 and 4 below can be obtained:

$$i_{dc} = \frac{3}{\pi} \int_{\pi/2}^{5\pi/6} i_a \cdot \frac{t_a - t_b}{T_s} + (i_a + i_b) \cdot \frac{t_b - t_c}{T_s} \cdot d(\omega t) \quad \text{[Expression 3]}$$

$$i_a = i_{out} \sin(\omega t - \phi), \quad \text{[Expression 4]}$$

$$\frac{t_a - t_b}{T_s} = d_a - d_b = \frac{\sqrt{3}}{2} m \cdot \cos\left(\omega t - \frac{\pi}{3}\right)$$

$$i_a + i_b = -i_c = i_{out} \sin\left(\omega t + \frac{2\pi}{3} - \phi\right),$$

$$\frac{t_b - t_c}{T_s} = d_b - d_c = -\frac{\sqrt{3}}{2} m \cdot \cos(\omega t)$$

where $D_a = \frac{t_a}{T_s}, D_b = \frac{t_b}{T_s}, D_c = \frac{t_c}{T_s}.$

By substituting Expression 4 into Expression 3, $i_{dc}$ can be calculated using Mathematical Expression 5:

$$i_{dc} = \frac{3\sqrt{2}}{4} i_{out} \cdot m \cdot pf_m \quad \text{[Expression 5]}$$

where m denotes a modulation index, and $pf_m$ denotes inverter efficiency.

In accordance with one embodiment of the present disclosure, the controller 160 may use Expression 5 so as to calculate $i_{dc}$ in Expression 1 or Expression 2.

The storage unit 180 may store the modulation index m and the inverter efficiency, and the controller 160 may use the stored modulation index and inverter efficiency to calculate Expression 5.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings. Accordingly, the true scope of the present disclosure sought to be protected is defined only by the appended claims.

What is claimed is:

1. An apparatus for detecting a fault in a power relay of an inverter, the apparatus comprising:
    a voltage sensor configured to measure a voltage of a DC link;
    a current sensor configured to measure an output current to an inverter stage;
    a storage unit configured to store a resistance of an initial charge resistor, a time constant of a capacitor, and a reference voltage measured when no voltage drop occurs at the DC link; and
    a controller configured to determine, when the voltage drop occurs at the DC link, whether there is the fault in the power relay based on a difference between the reference voltage and a voltage measured after a period of time corresponding to the time constant has elapsed,
    wherein the controller compares the difference between the voltages with a voltage drop determined by the output current and the resistance, thereby determining whether there is the fault in the power relay.

2. The apparatus of claim 1, wherein the controller, when the voltage drop occurs, compares a rate of the voltage drop per unit time with a rate calculated based on the measured output current, thereby determining whether the voltage drop lasts.

3. The apparatus of claim 2, wherein the controller determines whether there is the fault in the power relay when the voltage drop lasts for a time period corresponding to the time constant.

4. The apparatus of claim 2, wherein the comparison between the rate of the voltage drop per unit time and the calculated rate based on the measured output current is represented by the following equation:

$$\frac{(V_{n+1} - V_n)/t_p}{i_{out}/i_{std}} > \frac{i_{dc} \times R}{\tau}$$

wherein n and n+1 are symbols for distinguishing voltage measurement times, $i_{out}$ denotes an output current, $i_{std}$ denotes a rated current, $t_p$ denotes a time interval between the voltage measurement times, $i_{dc}$ denotes a current passing through the initial charge resistor, R denotes the initial charge resistor, and $\tau$ denotes the time constant.

5. The apparatus of claim 4, wherein the controller determines that the voltage drop lasts if a left-hand side of the equation is larger than a right-hand side of the equation.

6. The apparatus of claim 5, wherein the controller determines that there is the fault in the power relay when the voltage drop lasts for a time period corresponding to the time constant.

7. The apparatus of claim 1, wherein the power relay is connected to the resistor in parallel, and the power relay is disposed between a converter stage and the DC link having the capacitor.

8. The apparatus of claim 1, wherein the voltage sensor is configured to measure the voltage of the DC link periodically.

9. The apparatus of claim 1, wherein the comparison between the voltages with the voltage drop determined by the output current and the resistance is represented by the following equation:

$$\frac{(V_i - V_f)}{i_{out}/i_{std}} > i_{dc} \times R$$

wherein $V_i$ denotes a reference voltage, $V_f$ denotes a voltage measured after a time period corresponding to the time constant has elapsed, $i_{out}$ denotes an output current, $i_{std}$ denotes a rated current, $i_{dc}$ denotes a current passing through the initial charge resistor, and R denotes the initial charge resistor.

10. The apparatus of claim 9, wherein the controller determines that there is the fault in the power relay if a left-hand side of the equation is larger than a right-hand side of the equation.

11. The apparatus of claim 9, wherein the controller determines that there is no fault in the power relay if a left-hand side of the equation is equal to or smaller than a right-hand side of the equation.

* * * * *